(12) United States Patent
Balboni et al.

(10) Patent No.: US 10,507,836 B2
(45) Date of Patent: Dec. 17, 2019

(54) DUAL MOTOR DRIVE UNIT AND METHOD OF DRIVINGLY ENGAGING A FIRST MOTOR OF A DUAL MOTOR DRIVE UNIT WITH AN OUTPUT SHAFT

(71) Applicant: DANA ITALIA S.P.A., Arco (TN) (IT)

(72) Inventors: Luca Balboni, Rovereto (IT); Giulio Ornella, Arco (IT)

(73) Assignee: Dana Italia Srl, Arco, Trento (IT)

( * ) Notice: Subject to any disclaimer, the term of this patent is extended or adjusted under 35 U.S.C. 154(b) by 300 days.

(21) Appl. No.: 15/516,054

(22) PCT Filed: Oct. 12, 2015

(86) PCT No.: PCT/EP2015/073602
§ 371 (c)(1),
(2) Date: Mar. 31, 2017

(87) PCT Pub. No.: WO2016/059009
PCT Pub. Date: Apr. 21, 2016

(65) Prior Publication Data
US 2017/0305426 A1    Oct. 26, 2017

(30) Foreign Application Priority Data

Oct. 16, 2014 (EP) .................................... 14425132

(51) Int. Cl.
*B60W 10/02* (2006.01)
*B60W 10/103* (2012.01)
(Continued)

(52) U.S. Cl.
CPC ........... *B60W 30/188* (2013.01); *B60K 17/10* (2013.01); *B60W 10/02* (2013.01);
(Continued)

(58) Field of Classification Search
CPC .............. B60W 10/02; B60W 10/103; B60W 2710/021; B60W 2510/0208; F16H 61/444; F16H 61/42
See application file for complete search history.

(56) References Cited

U.S. PATENT DOCUMENTS 4,663,714 A * 5/1987 Cornell ................ B60W 10/02
192/3.58
6,202,016 B1 3/2001 Stephenson et al.
(Continued)

FOREIGN PATENT DOCUMENTS

DE        19901443 A1    8/2000
DE    202004009767 U1    9/2004
(Continued)

OTHER PUBLICATIONS

European Patent Office, The International Search Report with Written Opinion, 8 pages ; dated Dec. 5, 2015, The European Patent Office, Rijswijk, Netherlands.
(Continued)

*Primary Examiner* — Sherry L Estremsky
(74) *Attorney, Agent, or Firm* — Marshall & Melhorn, LLC

(57) ABSTRACT

A method of drivingly engaging a first motor of a dual motor drive unit with an output shaft driven by a second motor of the dual motor drive unit includes actuating a clutching device for drivingly engaging the first motor with the output shaft. Next, a rotational speed of the first motor is synchronized with a rotational speed of the output shaft. When the rotational speed of the first motor and the rotational speed of the output shaft are synchronized, an output torque of the first motor is reduced. When the clutching device drivingly engages the first motor with the output shaft, the output
(Continued)

torque of the first motor is increased. The invention further relates to a dual motor drive unit for carrying out the method.

13 Claims, 6 Drawing Sheets

(51) Int. Cl.
*B60W 30/188* (2012.01)
*F16H 61/42* (2010.01)
*F16H 61/444* (2010.01)
*B60K 17/10* (2006.01)
*F16D 48/06* (2006.01)
*F16H 39/02* (2006.01)
*F16H 61/4096* (2010.01)
*F16H 47/02* (2006.01)

(52) U.S. Cl.
CPC ........... *B60W 10/103* (2013.01); *F16D 48/06* (2013.01); *F16H 39/02* (2013.01); *F16H 61/4096* (2013.01); *F16H 61/42* (2013.01); *F16H 61/444* (2013.01); *B60W 2510/0208* (2013.01); *B60W 2510/104* (2013.01); *B60W 2520/10* (2013.01); *B60W 2520/105* (2013.01); *B60W 2540/10* (2013.01); *B60W 2540/12* (2013.01); *B60W 2710/021* (2013.01); *B60W 2710/105* (2013.01); *B60W 2710/1038* (2013.01); *B60W 2710/1088* (2013.01); *F16D 2500/1088* (2013.01); *F16D 2500/10412* (2013.01); *F16D 2500/30825* (2013.01); *F16H 2047/025* (2013.01)

(56) References Cited

U.S. PATENT DOCUMENTS 6,250,180 B1 * 6/2001 Legner .................... F16H 47/02
74/733.1
9,260,108 B2 * 2/2016 Wang .................... B60W 30/19
9,353,841 B2    5/2016 Schnabel

FOREIGN PATENT DOCUMENTS

| DE | 60024935 T2 | 7/2006 |
| DE | 202005007970 U1 | 10/2006 |
| DE | 102012010946 A1 | 12/2013 |
| DE | 102012024068 A1 | 6/2014 |
| EP | 2503187 B1 | 9/2012 |
| WO | 2013083766 A1 | 6/2013 |

OTHER PUBLICATIONS

European Patent Office, Extended European Search Report, 6 pages, dated May 28, 2015, European Patent Office, Munich, Germany.

* cited by examiner

DUAL MOTOR DRIVE UNIT AND METHOD OF DRIVINGLY ENGAGING A FIRST MOTOR OF A DUAL MOTOR DRIVE UNIT WITH AN OUTPUT SHAFT

BACKGROUND OF THE INVENTION

The present invention relates to a method of drivingly engaging a first motor of a dual motor drive unit with an output shaft of the dual motor drive unit. The present invention further relates to a dual motor drive unit for carrying out the method and to a vehicle comprising a corresponding dual motor drive unit.

Dual motor drive units comprising a first motor and a second motor for driving an output shaft are generally known for their good performance and their high efficiency. Usually, one of the two motors, for example the first motor, is engaged with the output shaft at low output speed and high output torque while it is disengaged from the output shaft at high output speed and low output torque. Thus, dual motor transmissions typically include a mechanism for selectively engaging the first motor with the output shaft, for example a hydraulic clutch. It is generally desirable that the process of engaging the first motor with the output shaft be carried out with maximum smoothness. That is, abrupt variations in gear ratio or traction are to be avoided in order to minimize wear of the mechanical parts and to make the drive unit easier to control.

In order to enhance the smoothness of the engagement process, it has been proposed to equip the clutch with devices such as proportional valves which allow the clutch to be controlled with improved precision. However, the use of these devices usually increases production costs.

Thus, the technical problem underlying the present invention consists of providing an alternative method of engaging a first motor of a dual motor drive unit with an output shaft of the dual motor drive unit. The method should provide a low degree of wear of the mechanical components and a high degree of controllability for the operator. The technical problem underlying the present invention further consists of providing a preferably low cost dual motor drive unit for carrying out the method.

SUMMARY OF THE INVENTION

Thus, the invention provides a method of drivingly engaging a first motor of a dual motor drive unit with an output shaft driven by a second motor of the dual motor drive unit comprises the following steps:
  actuating a clutching device adapted to drivingly engage the first motor with the output shaft;
  synchronizing a rotational speed of the first motor with a rotational speed of the output shaft;
  when the rotational speed of the first motor and the rotational speed of the output shaft are synchronized, reducing an output torque of the first motor; and
  when the clutching device drivingly engages the first motor with the output shaft, increasing the output torque of the first motor.

Typically, the dual motor drive unit is operated such that at high rotational speed of the output shaft, for example when the rotational speed of the output shaft is higher than a threshold speed of the output shaft, the output shaft is drivingly engaged with the second motor and not drivingly engaged with the first motor. That is, usually the first motor is additionally drivingly engaged with the output shaft only when the rotational speed of the output shaft is lower than or falls below the threshold speed of the output shaft and/or when the torque required at the output shaft is higher than a threshold torque. Thus, the presently proposed method is typically carried out during a deceleration of the rotational speed of the output shaft.

Typically, the clutching device drivingly engages the first motor with the output shaft only after the steps of synchronizing the first motor with the output shaft and of reducing the output torque of the first motor have been completed. Reducing the output torque of the first motor once the rotational speed of the first motor is synchronized with the rotational speed of the output shaft of the dual motor drive unit guarantees a smooth engagement of the first motor with the output shaft. In this way, mechanical wear of the mechanical transmission is reduced and a jerk caused by the engagement process is minimized. The proposed method further guarantees a smooth and continuous variation of a traction conveyed by the output shaft. The output shaft may be a driveshaft or a wheel shaft of a vehicle. The vehicle may be an off-highway vehicle, for example an agricultural vehicle such as a tractor or a harvester, or an industrial vehicle such as a wheel loader, a dumper, a crawler, or the like.

The clutching device may be a hydraulic clutch. Actuating the clutching device may therefore include actuating a hydraulic valve. Preferably, the clutching device drivingly engaging the first motor with the output shaft includes drivingly engaging the first motor with the output shaft through static friction without any slip. In other words, the first motor being drivingly engaged with the output shaft preferably includes that a ratio of the rotational speed of the output shaft to the rotational speed of the first motor is equal to a gear ratio of the mechanical transmission between the output shaft and the first motor. Usually, the clutching device drivingly engaging the first motor with the output shaft is delayed with respect to the actuating of the clutching device. The duration of this delay typically depends on the design or on the mode of operation of the clutching device. For example, the duration of the delay may be at least 10 milliseconds or at least 20 milliseconds. Additionally or alternatively, the duration of the delay may be less than 500 milliseconds, less than 300 milliseconds or less than 150 milliseconds.

Synchronizing the first motor with the output shaft typically includes executing a synchronization algorithm carried out during a synchronization time interval corresponding to a synchronization duration. Here and in the following, the term "synchronization algorithm" and the term "synchronization process" are used synonymously. The synchronization algorithm may use one or several synchronization parameters as inputs. In an embodiment of the proposed method, the actuating of the clutching device and the synchronising of the first motor with the output shaft are initiated simultaneously, for example at a point in time T1. For example, the synchronizing and the actuating may be initiated once the rotational speed of the output shaft falls below the previously mentioned threshold speed of the output. If the dual motor drive unit is part of a vehicle driveline, the threshold speed of the output shaft is typically associated with a threshold speed of the vehicle. Therefore, the synchronizing and the actuating may likewise be initiated once a vehicle speed falls below the threshold vehicle speed. The output shaft threshold speed and/or the vehicle threshold speed are preferably determined based on a current vehicle speed and/or based on an acceleration signal or a deceleration signal provided by an operator of the vehicle. For example, the output shaft threshold speed and/or the vehicle threshold speed may be determined based on a position of an acceleration pedal of the vehicle. The previously mentioned synchronization parameters which the synchronization algorithm may use as inputs may include at least one of the current vehicle speed, the acceleration pedal position, the threshold output shaft speed and the threshold vehicle speed. Within the scope of this application, the formulation "at last one of $x_1, \ldots, x_n$," may include any subset of $x_1, \ldots, x_n$, including the complete set.

In a further embodiment of the presently proposed method, synchronizing the rotational speed of the first motor with the rotational speed of the output shaft includes determining an engagement speed of the first motor and tuning the rotational speed of the first motor to the engagement speed. The engagement speed of the first motor is the speed which the first motor must preferably reach before or right before the clutching device drivingly engages the first motor with the output shaft. Preferably, the engagement speed of the first motor is given by the speed of the output shaft at the time of engagement multiplied by the gear ratio of the transmission between the output shaft and the first motor. If the clutching device drivingly engages the first motor with the output shaft when the rotational speed of the first motor matches the engagement speed, an acceleration of the first motor and a jerk caused by the engagement process are minimized. The rotational speed of the first motor matching the engagement speed may include the rotational speed of the first motor falling within a predetermined speed interval which comprises the engagement speed.

Preferably, the engagement speed of the first motor is determined based on at least one of the current output shaft speed, the current vehicle speed, the threshold output shaft speed, the threshold vehicle speed, the accelerator pedal position, and the gear ratio of the transmission between the first motor and the output shaft. The synchronization parameters which the synchronization algorithm may use as inputs may therefore include the gear ratio of the transmission between the first motor and the output shaft.

In a further embodiment of the proposed method, the rotational speed of the first motor and the rotational speed of the output shaft are regarded as being synchronized once the rotational speed of the first motor matches the engagement speed or once the duration of the synchronization process exceeds a maximum synchronization duration. The synchronization parameters which the synchronization algorithm may use as inputs may include the maximum synchronization duration. The maximum synchronization duration may be up to 500 milliseconds, up to 300 milliseconds or up to 200 milliseconds, for example. The point in time at which the rotational speed of the first motor and the rotational speed of the output shaft are first synchronized typically marks the end of the synchronizing or, equivalently, of the synchronization process or of the synchronization algorithm. This point in time may be termed T2.

The first motor may be a variable displacement hydrostatic motor in fluid communication with a hydrostatic pump, preferably a variable displacement hydrostatic pump. Typically, the hydrostatic pump is drivingly engaged with a power source such as an internal combustion engine (ICE) or an electric engine. The first motor may be a hydraulic axial piston motor or a hydraulic radial piston motor or any other kind of variable displacement hydrostatic motor known in the art. Likewise, the hydrostatic pump may be a hydraulic axial piston pump or a hydraulic radial piston pump or any other kind of variable displacement hydrostatic pump known in the art. In a further embodiment of the proposed method, the synchronizing includes at least one of changing the hydraulic displacement of the first motor and changing the hydraulic displacement of the hydrostatic pump. Changing the hydraulic displacement of the first motor may include at least one of increasing and decreasing the hydraulic displacement of the first motor. Likewise, changing the hydraulic displacement of the hydrostatic pump may include at least one of increasing and decreasing the hydraulic displacement of the hydrostatic pump.

Typically, the synchronizing includes increasing the hydraulic displacement of the first motor in order to accelerate the first motor to the engagement speed. The hydraulic displacement of the first motor may be increased once the synchronization process is initiated, for example at T1. Like the first motar, the second motor may be configured as a hydrostatic motor in fluid communication with the hydrostatic pump. In this case, changing the hydraulic displacement of the first motor usually influences the fluid pressure in the second motor. This may cause variations in the torque transferred to the output shaft through the second motor and result in an undesired acceleration of the output shaft or in undesired jerks.

The synchronizing may therefore include increasing the hydraulic displacement of the first motor and increasing the hydraulic displacement of the hydrostatic pump, preferably simultaneously. For example, as the hydraulic displacement of the first motor is increased during the synchronization process, the hydraulic displacement of the hydrostatic pump may simultaneously be increased such that the flow rate of a hydraulic liquid flowing through the second hydrostatic motor remains constant or substantially constant. This may be achieved by increasing the hydraulic displacement of the hydrostatic pump based on the rotational speed of the hydrostatic pump.

In particular, the displacement of the hydrostatic pump may be increased such that this increase is a decreasing function of the current rotational speed of the hydrostatic pump. The rotational speed of the hydrostatic pump can usually be regulated via an actuator configured to regulate the output torque or the output speed of the power source. This actuator may be an accelerator pedal, for example. Thus, the increase in the hydraulic displacement of the hydrostatic pump determined by the synchronization algorithm to counter the pressure drop in the second hydrostatic motor is preferably a decreasing function of the actuator displacement (e.g. accelerator pedal percentage).

In a further embodiment of the proposed method, the tuning of the rotational speed of the first motor to the engagement speed includes applying a proportional-integral (PI) controller. For example, the engagement speed of the first motor may be used as the desired value of the PI controller and the displacements of the first motor may be used as the control variable of the PI controller. Preferably, the PI controller has an anti wind-up functionality. That is, tuning the rotational speed of the first motor to the engagement speed may include keeping the hydraulic displacement of the first motor below an upper bound or not increasing the hydraulic displacement of the first motor beyond the upper bound. This upper bound may be determined based on the rotational speed of the first motor or on the engagement speed. The synchronization parameters which the synchronization algorithm may use as inputs may include a rate at which the hydraulic displacement of the first motor or the hydraulic displacement of the hydrostatic pump is changed. Also, the synchronization parameters may include the upper bound of the hydraulic displacement of the first motor used by the PI controller.

In a further embodiment of the proposed method, reducing the output torque of the first motor once the first motor and the output shaft have been synchronized includes at least one of reducing the hydraulic displacement of the first motor and reducing the hydraulic displacement of the hydrostatic pump. Again, reducing the hydraulic displacement of the first motor and reducing the hydraulic displacement of the hydrostatic pump may be carried out simultaneously. For example, as the hydraulic displacement of the first motor is reduced, the hydraulic displacement of the hydrostatic pump may simultaneously be adjusted or reduced such that the flow rate of a hydraulic liquid flowing through the second hydrostatic motor remains constant or substantially constant in order to avoid undesirable jerks. Preferably, the hydraulic displacement of the first motor is reduced at least by 50 percent with respect to a reference hydraulic displacement of the first motor at the end of the synchronization process, i.e. at T2. Preferably, the hydraulic displacement of the first motor is reduced to zero. Preferably, the hydraulic displacement of the hydrostatic pump is reduced to a reference displacement of the hydrostatic pump at the point in time at which the synchronization process was initiated, for example at T1. Preferably, the hydraulic displacement of the first motor and the hydraulic displacement of the hydrostatic pump are reduced such that they reach their respective reference values at the same time, for example at a point in time T3.

A point in time at which the clutching device drivingly engages the first motor with the output shaft for the first time after the synchronizing has been completed may be termed T4. Typically, at least one of the following relations holds: T1<T2; T2<T3; T3<T4. Increasing the output torque of the first motor once the clutching device has drivingly engaged the first motor with the output shaft may include increasing the hydraulic displacement of the first motor.

A further embodiment of the proposed method aims at gradually improving the synchronization process over a number of iterations of the synchronization process. Specifically, this embodiment includes the additional steps of detecting an acceleration of the output shaft and/or detecting an acceleration of the vehicle during the synchronization process. If the detected acceleration exceeds a threshold output shaft acceleration or a threshold vehicle acceleration, the value or values of at least one of the following synchronization parameters used as input or inputs for the synchronization algorithm may be altered:

the maximum synchronization duration;
the upper bound of the hydraulic displacement of the first motor;
the rate of changing the hydraulic displacement of the first motor during the synchronization process; and
the rate of changing the hydraulic displacement of the hydrostatic pump during the synchronization process.

Preferably, these input values are modified after the current synchronization process has been completed and before a subsequent run of the synchronization algorithm is initiated.

In this embodiment, at least one of the above mentioned synchronization parameters or parameter values is modified in such a way that the output shaft acceleration does not exceed the threshold output shaft acceleration in the subsequent run of the synchronization algorithm, and/or that the vehicle acceleration does not exceed the threshold vehicle acceleration in the subsequent run of the synchronization algorithm. The threshold output shaft acceleration may be 0 $s^{-2}$. Additionally or alternatively, the threshold vehicle acceleration may be zero $m/s^2$. In other words, preferably at least one of the synchronization parameters or synchronization parameter values is modified in such a way that, in the subsequent run of the synchronization algorithm, the output shaft/vehicle is continuously and smoothly decelerated during the synchronization process. A positive acceleration during the synchronization process could be perceived as an undesirable jerk of the drive unit or the vehicle.

It is pointed out that, unless stated to the contrary, the proposed method may comprise arbitrary combinations of features and method steps of the different embodiments described above.

The invention further provides a dual motor hydrostatic drive unit, said drive unit being adapted to carry out the previously described method. The drive unit comprises at least:

an output shaft;
a first hydrostatic motor;
a clutching device adapted to selectively drivingly engage the first motor with the output shaft;
a second motor drivingly engaged or selectively drivingly engaged with the output shaft;
a first speed sensor for measuring a rotational speed of the first motor;
a second speed sensor for measuring a rotational speed of the output shaft; and
a control unit;
wherein the control unit is adapted to control the clutching device;
wherein the control unit is adapted to control the rotational speed of the first motor and to synchronize the rotational speed of the first motor with the rotational speed of the output shaft;
wherein the control unit is adapted reduce an output torque of the first motor when or once the first motor and the output shaft are synchronized; and
wherein the control unit is adapted to increase the output torque of the first motor when or once the clutching device drivingly engages the first motor with the output shaft.

Controlling the clutching device may include actuating the clutching device such as to at least one of engage the first motor with the output shaft and disengage the first motor from the output shaft. Controlling the rotational speed of the first motor may include at least one of increasing the speed of the first motor, decreasing the speed of the first motor, and keeping the speed of the first motor constant.

In an embodiment of the proposed dual motor drive unit, the first motor is configured as or includes a variable displacement hydrostatic motor and the hydrostatic pump is configured as or includes a variable displacement hydrostatic pump. The control unit may then be adapted to control the hydraulic displacement of the first motor and to control the hydraulic displacement of the hydrostatic pump. Controlling the hydraulic displacement of the first motor/of the pump may include at least one of increasing the displacement, decreasing/reducing the displacement, and keeping the displacement constant. In particular, the control unit may be adapted to carry out the above described method of drivingly engaging the first motor with the output shaft. That is, the control unit may be adapted to run the above described synchronization algorithm and to control at least one of the hydrostatic pump, the first hydrostatic motor and the clutching device according to the control algorithm.

In a further embodiment, the proposed dual motor hydrostatic drive unit further includes:

a hydraulic accumulator assembly comprising a high pressure hydraulic accumulator and a low pressure hydraulic accumulator; and at least one accumulator valve adapted to selectively fluidly connect the hydraulic accumulator assembly to at least one of the first motor, the second motor and the hydrostatic pump;

wherein the control unit is adapted to control the accumulator valve for regulating the hydrostatic pressure in the hydrostatic circuit comprising at least one of the first motor, the second motor and the hydrostatic pump.

Regulating the hydrostatic pressure in the hydrostatic circuit may include at least one of increasing the hydrostatic pressure, decreasing or reducing the hydrostatic pressure, or keeping the hydrostatic pressure constant.

In a further embodiment, the control unit may be adapted to control the at least one accumulator valve such that the hydrostatic energy stored in the accumulator assembly is used or is additionally used for synchronizing the rotational speed of the first motor with the rotational speed of the output shaft. The control unit may be adapted to control the accumulator valve such that the hydrostatic energy stored in the accumulator assembly is used or is additionally used for tuning the rotational speed of the first motor to the engagement speed as described above. For example, the PI controller described above may use or may additionally use a control state of the accumulator valve as a control variable.

In a further embodiment, the control unit may be adapted to control the at least one accumulator valve such that, when the rotational speed of the first motor and the rotational speed of the output shaft are synchronized, the hydrostatic energy stored in the accumulator assembly is used or is additionally used for reducing the output torque of the first motor, typically by reducing the hydrostatic pressure in the first motor.

In a further embodiment, the control unit may be adapted to control the at least one accumulator valve such that, when or once the clutching device drivingly engages the first motor with the output shaft, the hydrostatic energy stored in the accumulator assembly is used or is additionally used for increasing the output torque of the first motor, typically by increasing the hydrostatic pressure in the first motor.

The control unit may comprise a programmable processor, microcontroller or FPGA. The control unit may be electronically connected to at least one of the first motor, the second motor, the hydrostatic pump, the first speed sensor, the second speed sensor and the accumulator valve. Controlling any of these components or devices using the control unit may include sending an electronic control signal.

The invention further provides a vehicle comprising the above described dual motor hydrostatic drive unit. The vehicle may be an off-highway vehicle, for example an agricultural vehicle or an industrial vehicle. In particular, the vehicle may be a tractor, a harvester, a wheel loader, a dumper, a crawler, or the like.

BRIEF DESCRIPTION OF THE DRAWINGS

The above, as well as other advantages of the present invention will become readily apparent to those skilled in the art from the following detailed description when considered in the light of the accompanying drawings in which.

DETAILED DESCRIPTION OF THE INVENTION

Figure 1:
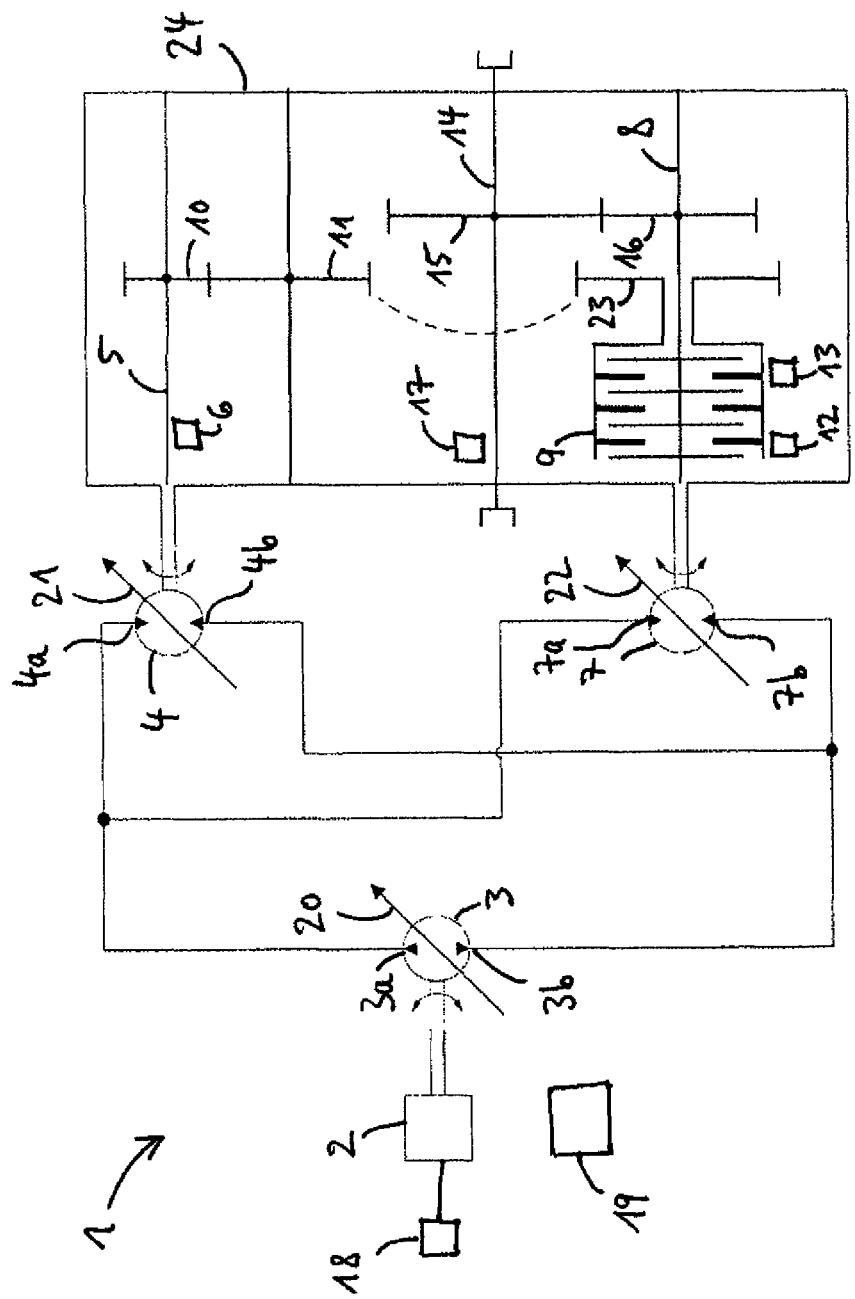
FIG. 1 shows a schematic illustration of a dual motor drive unit according to a first embodiment of the invention.

FIG. 1 shows an embodiment of a dual motor hydrostatic transmission drive unit 1 according to the present invention. Here and in the following, recurring features are designated with the same reference signs. The dual motor drive unit 1 is disposed in a vehicle, e.g. a wheel loader (not shown), and comprises: a power source 2 drivingly engaged with a reversible variable displacement hydrostatic pump 3, a first reversible variable displacement hydrostatic motor 4 drivingly engaged with a first shaft 5, a first speed sensor 6 adapted to measure a rotational speed of the first motor 4, a second reversible variable displacement hydrostatic motor 7 drivingly engaged with a second shaft 8, a hydraulic clutching device 9 drivingly engaged with the first shaft 5 through gears 10, 11, 23 and adapted to selectively drivingly engage the first motor 4 with the second shaft 8 through corresponding clutch plates, a hydraulic valve 12 for regulating a hydrostatic pressure in a clutch chamber of the clutching device 9, a hydraulic pressure sensor 13 for detecting a hydrostatic pressure in the clutch chamber, an output shaft 14 drivingly engaged with the second shaft 8 through gears 15, 16, a second speed sensor 17 adapted to measure a rotational speed of the output shaft 14, an accelerator pedal 18 adapted to regulate an output torque and a rotational speed of the power source 2, and an electronic control unit 19 comprising a programmable microprocessor. The control unit 19 is electrically connected at least to the pump 3, the motors 4, 7, the speed sensors 6, 17, the hydraulic valve 12, the pressure sensor 13 and the accelerator pedal 18. Only for the sake of clarity, these electric connections are not explicitly shown in FIG. 1. The output shaft 14 is drivingly engaged or drivingly engageable with at least one axle of the vehicle (not shown). The shafts 5, 8, 14, the gears 10, 11, 15, 16, 23, and the clutching device 9 are disposed in a gearbox 24.

The power source 2 is an internal combustion engine (ICE). The hydrostatic pump 3 is a hydraulic axial piston pump with a movable swashplate 20. The first motors 4, 7 are configured as reversible hydraulic axial piston motors including movable swashplates 21, 22, respectively. In alternative embodiments, the pump 3 and the motors 4, 7 may be any other type of variable displacement hydrostatic pump/motor known in the art. The hydrostatic motors 4, 7 are in parallel fluid communication with the hydrostatic pump 3. That is, a first fluid port 3a of the hydrostatic pump 3 is fluidly connected to first fluid ports 4a, 7a of the motors 4, 7 and a second fluid port 3b of the hydrostatic pump 3 is fluidly connected to second fluid ports 4b, 7b of the motors 4, 7, respectively. The control unit 19 is adapted to control the hydraulic displacement of the pump 3 and of the motors 4, 7 wherein controlling the hydraulic displacement may include moving the swashplates 10, 21, 22, respectively.

The control unit 19 is further adapted to control the hydraulic valve 12. Controlling the hydraulic valve 12 includes switching the hydraulic valve 12 between a number of continuous or discrete control states, e.g. via corresponding electric signals. The control unit 19 is thus adapted to cause the clutching device 9 to drivingly engage the first motor 4 with the output shaft 14 and to disengage the first motor 4 from the output shaft 14 by controlling the hydraulic valve 12. The speed sensors 6, 17 are adapted to send electric speed signals indicating a rotational speed of the first motor 4 and of the output shaft 17 to the control unit 19, respectively. The control unit 19 is adapted to receive these speed signals. The pressure sensor 13 is adapted to send an electric signal indicating the hydraulic pressure in the clutch chamber to the control unit 19. The accelerator pedal 18 may be actuated by an operator of the vehicle. The accelerator pedal 18 is adapted to send an electric acceleration or deceleration input signal indicating a pedal position, e.g. a pedal percentage, to the control unit 19. The control unit 19 is configured to receive the electric signals from the pressure sensor 13 and from the accelerator pedal 18.

Figure 2:
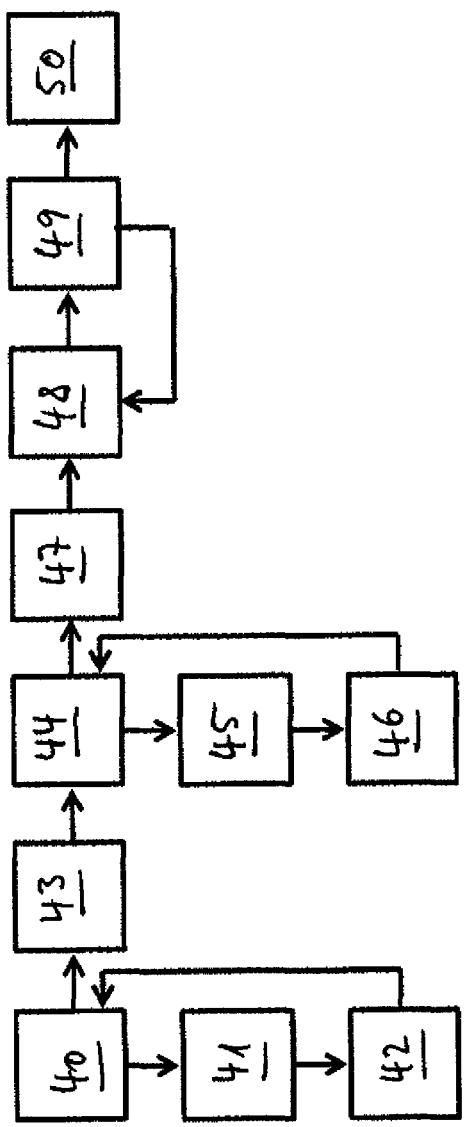
FIG. 2 shows a flow diagram including method steps according to an embodiment of the present invention.

An embodiment of a method of drivingly engaging the first motor 4 with the output shaft 14 which may be carried out using the dual motor drive unit 1 of FIG. 1 is explained with respect to FIGS. 2 to 5. FIG. 2 schematically shows a flow diagram including steps of the proposed method. FIGS. 3a-g show time sequences of different method parameter values.

FIG. 3a shows a time sequence of the value of a shift request variable 25. The shift request variable is set to "1" while a down shift is requested and to "0" otherwise.

FIG. 3b shows a time sequence of the value of a sync variable 26 indicating a state of the synchronization algorithm. The sync variable is set to "1" while the synchronization algorithm is being executed and to "0" otherwise.

FIG. 3c shows a time sequence of the value of a valve state variable 27. The valve state variable is set to "1" while the hydraulic valve 12 is switched to a position in which it influences the hydraulic pressure in the clutch chamber in such a way that it causes the hydraulic clutching device 9 to engage the first motor 4 with the output shaft 14. Otherwise the valve state variable is set to "0".

FIG. 3d shows a time sequence of the value of a clutch state variable 28. The clutch state variable is set to "1" while the pressure sensor 13 indicates that the clutching device 9 drivingly engages the first motor 4 with the output shaft 14, for example when the pressure sensor 13 indicates that the hydrostatic pressure in the clutch chamber exceeds a threshold pressure. Otherwise the clutch state variable is set to "0".

FIG. 3e shows a time sequence of the hydraulic displacement 29 of the hydrostatic pump 3.

FIG. 3f shows a time sequence of the hydraulic displacement 30 of the first motor 4.

FIG. 3g shows a time sequence of the value of the engagement speed 31 of the first motor 4. FIG. 3g further shows a time sequence of the rotational speed 32 of the first motor 4 measured by the first speed sensor 6.

The method whose steps are schematically depicted in FIG. 2 is initiated or carried out while the power source 2 drives the output shaft 14 via the hydrostatic pump 3 and via the second hydrostatic motor 7, thereby causing the vehicle to move at a vehicle speed $v_{vehicle}$. When the method is initiated, the first hydrostatic motor 4 is not drivingly engaged with the output shaft 14. Typically, the method is initiated or performed while the vehicle is decelerating.

In the flow diagram of FIG. 2, a first step 40 of the proposed method of drivingly engaging the first motor 4 with the output shaft 14 includes detecting the current vehicle speed $v_{vehicle}$ and detecting a position or a percentage of the accelerator pedal 18. The vehicle speed $v_{vehicle}$ is detected based on a speed signal from the second speed sensor 17. In a further step 41 which is executed at a point in time T0 (see FIG. 3), the control unit 19 determines a threshold vehicle speed $v_{th}$. $v_{th}$ is the vehicle speed at which the first motor 4 is to be engaged with the output shaft 14. The control unit 19 determines or computes $v_{th}$ based on the current vehicle speed $v_{vehicle}$ and based on the position or percentage of the accelerator pedal 18. In a further step 42, the control unit 19 compares the measured or detected vehicle speed $v_{vehicle}$ with the threshold vehicle speed $v_{th}$. As long as the current vehicle speed $v_{vehicle}$ exceeds the threshold vehicle speed $v_{th}$, that is as long as $v_{vehicle} > v_{th}$, the steps 40, 41, 42 are repeated.

Figure 3:
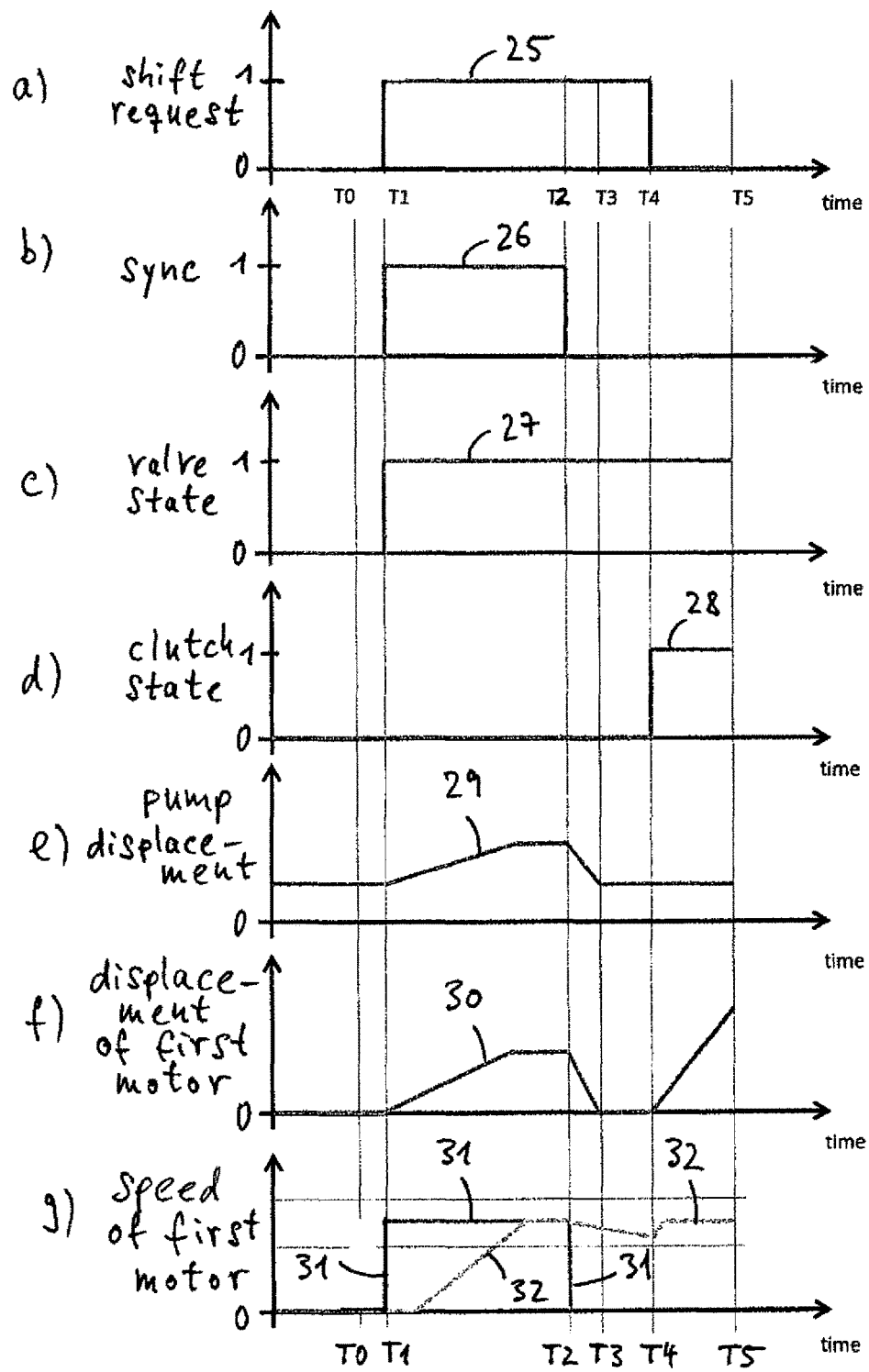
FIG. 3a-g shows time sequences of different method parameter values.

Once the current vehicle speed $v_{vehicle}$ is equal to or falls below the threshold vehicle speed, that is once $v_{vehicle} \leq v_{th}$, the method proceeds to step 43 which is executed at a point in time T1 (see FIG. 3). Step 43 marks the beginning of the synchronization process aimed at synchronizing the rotational speed of the first motor 4 with the rotational speed of the output shaft 14. In step 43, the control unit 19 sets the value of the shift request variable (FIGS. 3a) to "1", thereby indicating that the first motor 4 is to be engaged with the output shaft 14 using the hydraulic clutching device 9. The beginning of the synchronization process at time T1 is further characterized by the control unit 19 setting the value of the sync variable to "1" (see FIG. 3b).

Step 43 further includes the control unit 19 actuating the clutching device 9 by switching the hydraulic valve 12 to a state in which the hydraulic valve 12 causes the hydrostatic pressure in the clutch chamber to increase, thereby gradually causing the plates of the clutching device 9 to engage with the corresponding plates fixed to the shaft 8. The switching of the hydraulic valve 12 is indicated by the control unit 19 setting the value of the valve state variable to "1" at T1 (FIG. 3c).

Step 43 further includes the control unit 19 determining or computing the engagement speed of the first motor 4 and setting the value of the engagement speed from its initial value 0 s$^{-1}$ to the computed value, as indicated by the step in the time sequence 31 at time T1 (FIG. 3g). The computed value of the engagement speed 31 of the first motor 4 is the rotational speed which the first motor 4 must preferably reach before or right before the clutching device 9 drivingly engages the first motor 4 with the output shaft 14. The control unit 19 determines the engagement speed of the first motor 4 based on the previously computed value of the vehicle threshold speed $v_{th}$ and based on a gear ratio between the output shaft 14 and the first motor 4. For example, the engagement speed may be the rotational speed of the output shaft 14 corresponding to the threshold vehicle speed $v_{th}$ multiplied by the gear ratio between the first motor 4 and the output shaft 14. Engaging the first motor 4 with the output shaft 14 when the rotational speed of the first motor 4 is close to the engagement speed limits an acceleration of the first motor 4 during the engagement process and minimizes an undesirable jerk which the engagement process may entail. In an alternative embodiment of the proposed method, the control unit 19 may compute the engagement speed or target speed of the first motor 4 already at the point in time T0, that is once the threshold vehicle speed $v_{th}$ has been determined.

In order to tune the rotational speed of the first motor 4 to the engagement speed, starting at time T1 the synchronization process includes the control unit 19 increasing the hydraulic displacement 30 of the first motor 4 (FIG. 3f). This increase in the hydraulic displacement 30 of the first motor 4 is followed by a subsequent increase in the measured rotational speed 32 of the first motor 4 (see FIG. 3g).

Figure 4:
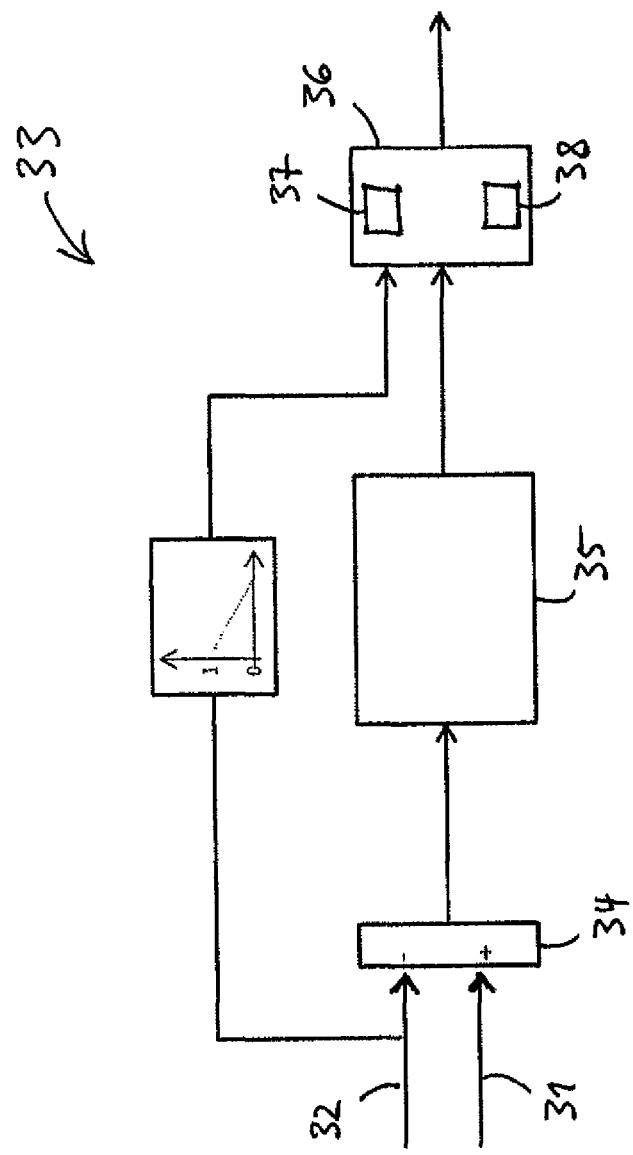
FIG. 4 shows a schematic illustration of a PI controller according to an embodiment of the invention.
Figure 5:
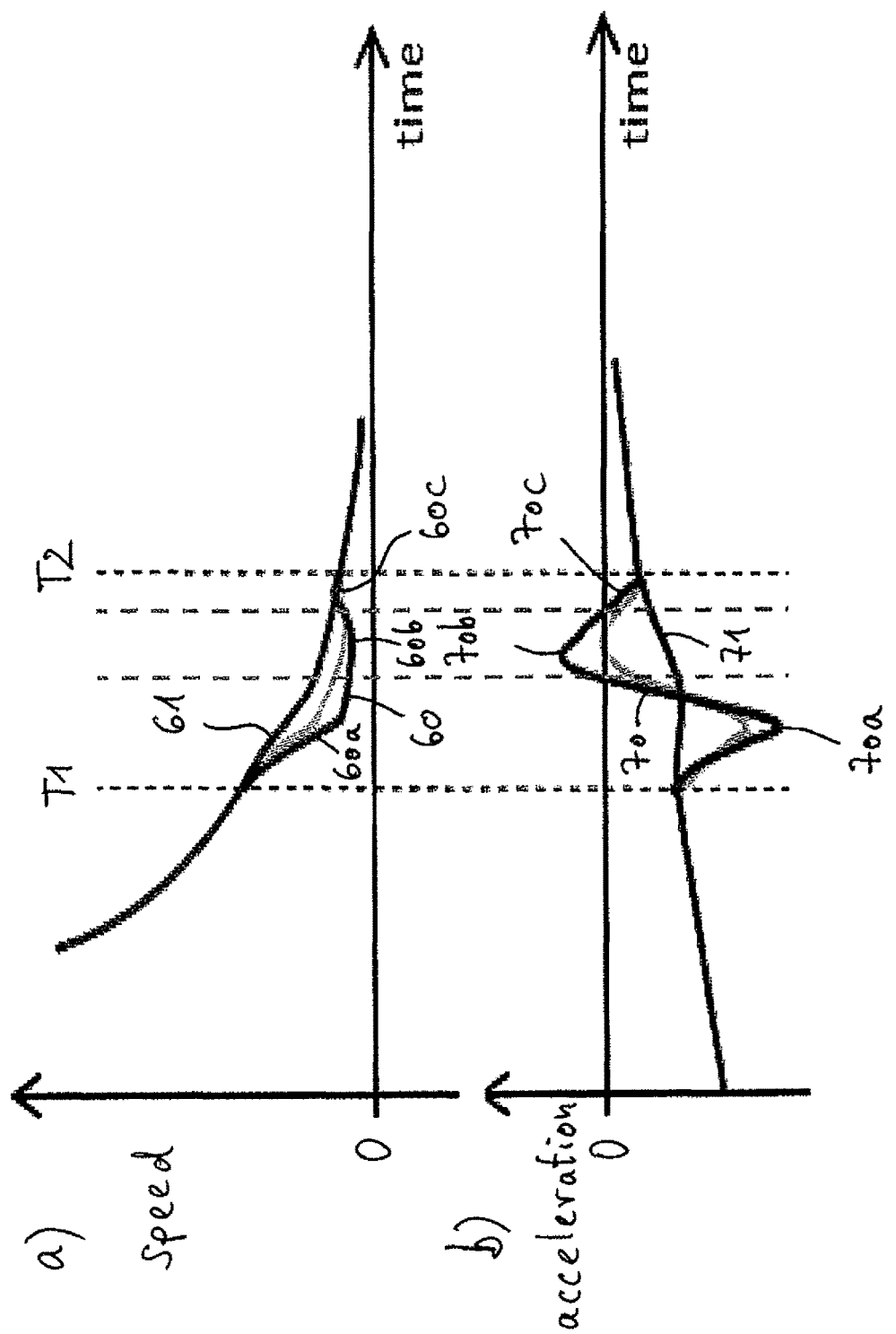
FIG. 5 shows a time sequence of a vehicle driven by the dual motor drive unit according to an embodiment of the invention.

More specifically, the control unit 19 tunes the rotational speed 32 of the first motor 4 to the engagement speed by applying a proportional integral (PI) controller 33, as shown in FIG. 4. The PI controller 33 may be part of the control unit 19. The PI controller 33 uses the previously calculated engagement or target speed 31 of the first motor 4 and the measured rotational speed 32 of the first motor 4 as inputs. In step 44 of the proposed method (FIG. 2), a comparator 34 (FIG. 4) computes a difference or error between the measured rotational speed 32 of the first motor 4 and the engagement speed 31. In step 45 (FIG. 2), a regulator 35 (FIG. 4) determines a target hydraulic displacement 30 of the first motor 4 based on the current error (proportional term) and based on the accumulated error (integral term).

In step 46 (FIG. 2), an actuator 36 (FIG. 4) moves the swashplate 21 of the first motor 4 (FIG. 1) for setting the hydraulic displacement 30 of the first motor 4 to the target hydraulic displacement. During the synchronization process, setting the hydraulic displacement 30 of the first motor 4 to the target displacement typically includes increasing the hydraulic displacement 30 of the first motor 4, preferably monotonically.

In other words, the PI controller 33 uses the hydraulic displacement 30 of the first motor 4 as the control variable. The PI controller 33 further includes an anti windup functionality. That is, the PI controller 33 is adapted not to increase the hydraulic displacement 30 of the first motor 4 beyond an upper bound 37 during the synchronization process. Additionally or alternatively, the PI controller 33 is adapted not to decrease the hydraulic displacement 30 of the first motor 4 below a lower bound 38 during the synchronization process. The control unit 19 is adapted to determine the value of the upper bound 37 based on the current rotational speed 32 of the first motor 4. Preferably, the value of the upper bound 37 is a decreasing function of the current rotational speed 32 of the first motor 4. For example, if the current rotational speed 32 of the first motor 4 is below a first (low) threshold speed, the upper bound 37 may be set to the maximum displacement of the first motor 4. However, if the current rotational speed 32 of the first motor 4 is above a second (high) threshold speed, the value of the upper bound 37 may be set to a lower displacement value, for example to a displacement value which is at most 90 percent, at most 80 percent or at most 70 percent of the maximum hydraulic displacement of the first motor 4. Limiting the hydraulic displacement 30 of the first motor 4 during the synchronization process may prevent the first motor 4 from overspeeding which may be caused, for example, by sudden system pressure changes.

Since the motors 4, 7 and the hydrostatic pump 3 are arranged in a closed hydraulic circuit, increasing the hydraulic displacement 30 of the first motor 4 typically causes a drop in hydraulic pressure in the second motor 7 and a drop in output torque provided by the second motor 7. The operator of the vehicle may perceive this pressure drop as an unexpected and undesired sudden deceleration of the vehicle.

In order to compensate this pressure drop in the second motor 7, step 46 includes the control unit 19 adjusting—here: monotonically increasing—the hydraulic displacement 29 of the hydrostatic pump 3 (FIG. 3e). The control unit 19 increases or adjusts the hydraulic displacement 29 of the hydrostatic pump 3 in such a way that a flow rate $Q_{M2}$ of a hydraulic fluid flowing through the second motor 7 stays constant or substantially constant during the synchronization process. This may be achieved by adjusting the flow rate $Q_p$ of the hydraulic fluid flowing through the hydrostatic pump 3 in such a way that it matches or substantially matches the sum of the (preferably constant) flow rate $Q_{M2}$ of the hydraulic liquid flowing through the second motor 7 and of the (increasing) flow rate $Q_{M1}$ of the hydraulic liquid flowing through the first motor 4: $Q_p=Q_{M1}+Q_{M2}$. In other words, the synchronization process may include the control unit 19 continuously increasing the flow rate $Q_p$ by an amount which matches the increasing flow rate $Q_{M1}$ of the first motor 4. The individual flow rates may be calculated using the relation $Q_i=V_i \cdot \omega_i \cdot \eta_i$, where in the index i stands for either one of p, M1 and M2 (Q: flow rate measured in $m^3 \cdot s^{-1}$; $V_i$: hydraulic displacement measured in $m^3$; $\omega_i$: angular velocity measured in $s^{-1}$; $\eta_i$: efficiency (dimensionless)).

In order to provide a constant or substantially constant torque at the output of the second motor 7 during the synchronization process, the control unit 19 increases or adjusts the hydraulic displacement of the hydrostatic pump 3 based on at least one of a rotational speed of the hydrostatic pump 3 and the position or percentage of the accelerator pedal 18. During the synchronization process the total hydraulic displacement $V_{p,total}$ of the hydrostatic pump 3 can be expressed as the sum of the hydraulic $V_{p,standard}$ of a standard hydrostatic transmission (including a hydrostatic pump in fluid communication with a single hydrostatic motor) and of an additional synchronization specific compensation term $V_{p,comp}$: $V_{p,total}=V_{p,standard}+V_{p,comp}$. Here, the control unit 19 controls the hydraulic displacement 29 of the pump 3 such that $V_{p,standard}$ is a monotonically increasing function of the rotational speed $\omega_p$ of the hydrostatic pump 3. Usually, $V_{p,standard}$ depends non-linearly on $\omega_p$. For example, $V_{p,standard}$ may include a term which is proportional to $\omega_n^2$.

Furthermore, the control unit 19 controls the hydraulic displacement 29 of the pump 3 such that $V_{p,comp}$ is a decreasing function of the rotational speed of the hydrostatic pump 3. For example, $V_{p,comp}$ may be of the following form: $V_{p,comp}(\omega_p)=a-b \cdot \omega_p$, where "a" and "b" are positive real numbers. Additionally or alternatively, $V_{p,comp}$ may be configured as a decreasing function of the position or percentage of the accelerator pedal 18. Usually, $V_{p,comp}$ is equal to or approximately equal to $0\ m^3$ when the accelerator pedal 18 is fully pressed (100 percent accelerator pedal).

The steps 44, 45, 46 are continuously repeated until the measured rotational speed 32 of the first motor 4 and the rotational speed of the output shaft 14 are synchronized. The rotational speed 32 of the first motor 4 and the rotational speed of the output shaft 14 are regarded as being synchronized if or as soon as one of the following conditions is met: a) an absolute value of a difference between the rotational speed 32 of the first motor 4 and the engagement speed 31 is smaller than five percent of the engagement speed 31, or b) a duration of the synchronization process exceeds 500 ms.

Once the rotational speed 32 of the first motor 4 and the rotational speed of the output shaft 14 are synchronized, the method proceeds to step 47 (FIG. 2). Step 47 is executed at a point in time T2 and marks the end of the synchronization process (FIG. 3). That is, the control unit 19 initiates the synchronization process at the point in time 11 and terminates the synchronization process at the point in time T2. In step 47, the control unit 19 resets the values of the sync variable 26 and of the engagement speed 31 to their initial values "0" and $0\ s^{-1}$, respectively, to indicate the end of the synchronization process (FIGS. 3b and 3g).

Step 47 further includes the control unit 19 reducing the output torque of the first motor 4 in order to reduce a torque transfer from the first motor 4 to the output shaft 14 during the subsequent engagement process. Reducing the output torque in step 47 includes reducing the hydraulic displacement 30 of the first motor 4 to approximately 0 m³ and, simultaneously, reducing the hydraulic displacement 29 of the hydrostatic pump 3 to its initial value, that is to its value at time T1. Due to the reduction of the hydraulic displacement 29 of the hydrostatic pump 3 and due to the reduction of the hydraulic displacement 30 of the first motor 4, the rotational speed 32 of the first motor 4 may slightly decrease (FIG. 3g). The process of reducing the hydraulic displacement 29 of the hydrostatic pump 3 and of reducing the hydraulic displacement 30 of the first motor 4 is completed at a point in time T3 (FIGS. 3e and 4f). From T3 onward, the control unit 19 leaves the hydraulic displacement 29 of the hydrostatic pump 3 unchanged.

At time the point in time T3 the method proceeds to step 48. In step 48, the hydraulic pressure sensor 13 measures a hydraulic pressure in the clutch chamber of the clutching device 9 and sends an electric pressure signal indicating the measured pressure value to the control unit 19. In step 49, the control unit 19 compares the measured pressure value with a threshold pressure value. Steps 48, 49 are continuously repeated until the measured pressure value exceeds the threshold pressure value. The measured pressure value exceeding the threshold pressure value is indicative of the clutching device 9 drivingly engaging the first motor 4 with the output shaft 14.

As soon as the first motor 4 and the output shaft 14 are drivingly engaged at a point in time T4, the method proceeds to step 50. In step 50, the control unit 19 sets the clutch state variable 28 to "1" (FIG. 3d) and increases the output torque of the first motor 4 by increasing the hydraulic displacement 30 of the first motor 4 (FIG. 3f). When the hydraulic displacement 30 of the first motor 4 is increased from T4 onward, the control unit 19 leaves the hydraulic displacement 29 of the hydrostatic pump 3 unchanged at its initial value. Increasing the hydraulic displacement 30 of the first motor 4 from T4 onward may result in an increase in the rotational speed 32 of the first motor (FIG. 3g).

In order to optimize the synchronization process over a number of iterations of the synchronization process, the synchronization process may include further steps aimed at smoothening the deceleration of the rotation of the output shaft 14 and/or of the vehicle during the synchronization process. To this end, the synchronization process includes the second speed sensor 17 continuously measuring the rotational speed of the output shaft 14 and sending electric signals indicating the measured speed values to the control unit 19.

FIG. 5a illustrates a first time sequence 60 of the vehicle speed $v_{vehicle}$ measured during a first synchronization process. FIG. 5b illustrates a corresponding first time sequence 70 of the vehicle acceleration computed by the control unit 19 using the first vehicle speed curve 60. Thus, the first vehicle acceleration curve 70 in FIG. 5b is the first time derivative of the first vehicle speed curve 60 in FIG. 5a. The first synchronization process is carried out using a first set of synchronization parameter values as inputs, such as: $T_{sync,max}$=300 ms ($T_{sync,max}$: maximum synchronization duration); $V_{M1,upper\ bound}$=0,9·$V_{M1,max}$ ($V_{M1,upper\ bound}$: upper bound 37 of the hydraulic displacement of the first motor 4, $V_{M1,max}$: maximum hydraulic displacement of the first motor 4); $dV_{M1,max}$/50 ms ($dV_{M1}$/dt: rate of changing the hydraulic displacement of the first motor 4 during the synchronization process); and $dV_p/dt=V_{p,max}$/50 ms ($dV_p$/dt: rate of changing the hydraulic displacement of the hydrostatic pump 3 during the synchronization process). It is understood that these values are mere examples. In alternative embodiments, different synchronization parameter values may be used.

The first curves 60, 70 may be subdivided into three consecutive sections 60a, 60b, 60c and 70a, 70b, 70c corresponding to a monotonically decreasing, a monotonically increasing and a monotonically decreasing vehicle speed $v_{vehicle}$ during the first synchronization process, respectively. The operator of the vehicle may perceive this alternating negative and positive vehicle acceleration illustrated by the first curves 60, 70 in FIG. 5 as an uncomfortable jerk. This undesirable vehicle behavior may the result of a non-optimal choice of one or several of the first set of synchronization parameter values. This non-optimal choice may be caused by a change in temperature or by mechanical wear of the components of the dual motor drive unit 1.

The control unit 19 compares the acceleration values of the first vehicle acceleration curve 70 with a threshold vehicle acceleration. In FIG. 5b this threshold vehicle acceleration is 0 m/s². The control unit 19 detects that the acceleration values of subsection 70b of the first vehicle acceleration curve 70 exceed the threshold acceleration of 0 m/s². Therefore, after the first synchronization process has been completed at time T2, the control unit 19 changes or adjusts at least one of the above mentioned synchronization parameter values. Specifically, the control unit 19 increases the maximum synchronization duration $T_{sync,max}$; the control unit 19 decreases the upper bound $V_{M1,upper\ bound}$ of the hydraulic displacement of the first motor 4 during the synchronization process; the control unit 19 increases the rate $dV_{M1}$/dt of changing the hydraulic displacement 30 of the first motor 4 during the synchronization process; and the control unit 19 increases the rate $dV_p$/dt of changing the hydraulic displacement 29 of the hydrostatic pump 3 during the synchronization process. These changed values constitute a second set of synchronization parameter values.

A subsequent second synchronization process carried out by the control unit 19 one minute or several minutes after the first synchronization process uses this second set of synchronization parameter values as inputs. FIG. 5a illustrates a second time sequence 61 of the vehicle speed $v_{vehicle}$ measured during the second synchronization process. FIG. 5b illustrates a corresponding second time sequence 71 of the vehicle acceleration computed by the control unit 19 using the second vehicle speed curve 61. The second vehicle acceleration curve 71 in FIG. 5b is the first time derivative of the second vehicle speed curve 61 in FIG. 5a. Clearly, the second vehicle speed curve 61 measured during the second synchronization process features a monotonically decreasing vehicle speed $v_{vehicle}$. The corresponding second vehicle acceleration curve 71 does not exceed the threshold vehicle acceleration of 0 m/s². Due to the adjustment of the synchronization parameter values the mechanical jerk observed during the first synchronization process is no longer present in the second synchronization process.

Figure 6:
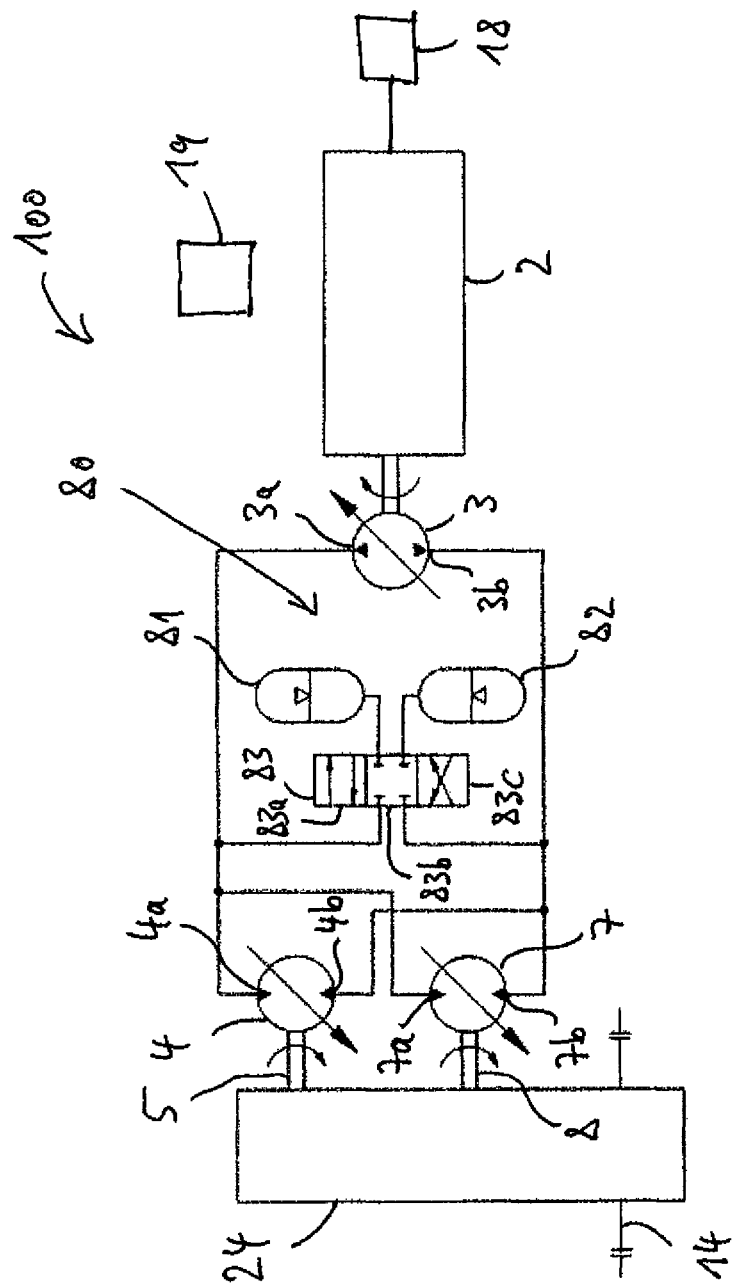
FIG. 6 shows a schematic illustration the dual motor drive unit according to a second embodiment of the invention.

FIG. 6 shows a schematic illustration of a dual motor drive unit 100 according an embodiment of the invention. The dual motor drive unit 100 of FIG. 6 includes all features of the dual motor drive unit 1 of FIG. 1; only for matters of clarity, not all features are designated with reference signs in FIG. 6. The dual motor drive unit 100 of FIG. 6 differs from the dual motor drive unit 1 of FIG. 1 in that the dual motor drive unit 100 additionally includes a hydraulic accumulator assembly 80 comprising at least one high pressure hydraulic accumulator 81, at least one low pressure accumulator 82 and at least one accumulator valve 83. The high pressure accumulator 81 and the low pressure accumulator 82 are configured as hollow vessels. A quantity of gas within the high pressure accumulator 81 is compressed when hydraulic fluid enters the high pressure accumulator 81. Analogously, a quantity of gas within the low pressure accumulator 82 is compressed when hydraulic fluid enters the low pressure accumulator 82. Usually, a hydraulic pressure in the high pressure accumulator 81 is higher than a hydraulic pressure in the low pressure accumulator 82.

The accumulator valve 83 is adapted to selectively fluidly connect the hydraulic accumulator assembly 80 to at least one of the hydrostatic pump 3, the first hydrostatic motor 4 and the second hydrostatic motor 7. The accumulator valve 83 is configured as a 4/3 way valve having four fluid ports and three control states 83a-c. When switched to the first control state 83a, the accumulator valve 83 fluidly connects the high pressure accumulator 81 to the first fluid ports 3a, 4a, 7a of the hydrostatic pump 3, the first motor 4 and the second motor 7, respectively, and fluidly connects the low pressure accumulator 82 to the second fluid ports 3b, 4b, 7b of the hydrostatic pump 3, the first motor 4 and the second motor 7, respectively. When switched to the second control state 83b, the accumulator valve 83 fluidly disconnects the high pressure accumulator 81 and the low pressure accumulator 82 from the hydrostatic pump 3, the first motor 4 and the second motor 7. When switched to the third control state 83c, the accumulator valve 83 fluidly connects the high pressure accumulator 81 to the second fluid ports 3b, 4b, 7b of the hydrostatic pump 3, the first motor 4 and the second motor 7, respectively, and fluidly connects the low pressure accumulator 82 to the first fluid ports 3a, 4a, 7a of the hydrostatic pump 3, the first motor 4 and the second motor 7, respectively.

The accumulator valve 83 is electrically connected to the control unit 19 (not shown). The control unit 19 is adapted to control the accumulator valve 83 using an electric signal. Controlling the accumulator valve 83 includes switching the accumulator valve 83 to one of its control states 83a-c. The control unit 19 is adapted to control the accumulator valve 83 for regulating the hydrostatic pressure in the hydrostatic circuit comprising at least one of the first motor 4, the second motor 7 and the hydrostatic pump 3. Regulating the hydrostatic pressure in the hydrostatic circuit may include at least one of increasing the hydrostatic pressure, decreasing or reducing the hydrostatic pressure, and keeping the hydrostatic pressure constant.

For example, hydrostatic energy stored in the hydraulic accumulator assembly 80 may be transferred to the motors 4, 7 and converted to mechanical energy by discharging the hydraulic accumulator assembly 80. Discharging the hydraulic accumulator assembly 80 typically includes lowering the hydrostatic pressure in the high pressure accumulator 81 and raising the hydrostatic pressure in the low pressure accumulator 82. Discharging the hydraulic accumulator assembly 80 typically includes switching the accumulator valve 83 to the first control state 83a. In the reverse direction, mechanical energy provided by the hydrostatic pump 3 and/or the motors 4, 7 may be converted to hydrostatic energy which may be stored in the accumulators 81, 82, thereby charging the accumulator assembly 80. Charging the accumulators 81, 82 typically includes raising the hydrostatic pressure in the high pressure accumulator 81 and lowering the hydrostatic pressure in the low pressure accumulator 82. Charging the hydraulic accumulator assembly 80 typically includes switching the accumulator valve 83 to the third control state 83c.

Synchronizing the rotational speed of the first motor 4 with the rotational speed of the output shaft 14 may include the control 19 unit controlling the accumulator valve 83 such that the hydraulic pressure stored in the accumulator assembly 80 is used for increasing the hydraulic pressure in at least one of the first motor 4 and the second motor 7, for example by switching the accumulator valve 83 to the first control state 83a. For instance, the hydraulic pressure in the first motor 4 may be increased in order to tune the rotational speed of the first motor 4 to the engagement speed 31. To that end, the PI controller 33 described above may use or may additionally use the control state of the accumulator valve 83 as a control variable. Additionally or alternatively, the hydraulic pressure in the second motor 4 may be increased in order to compensate or to partially compensate for the pressure drop caused by the increase in the hydraulic displacement 30 of the first motor 4.

Between the point in time T2, when the rotational speed of the first motor 4 and the rotational speed of the output shaft 14 are synchronized, and the point in time T4, when the clutching device 9 drivingly engages the first motor 4 with the output shaft 14, the control unit 19 may control the accumulator valve 83 such that the hydrostatic energy stored in the accumulator assembly 80 is used or is additionally used for providing a constant output torque at the second motor 7.

The control unit 19 is further adapted to control the at least one accumulator valve 83 such that, when or once the clutching device 9 drivingly engages the first motor 4 with the output shaft 14 at time T4, the hydrostatic energy stored in the accumulator assembly 80 is used or is additionally used for increasing the output torque of the first motor 4. To that end, the control unit 19 typically switches the accumulator valve 83 to the first control state 83a in order to increase the hydrostatic pressure in the first motor 4.

The invention claimed is:

1. A method of drivingly engaging a first motor of a dual motor drive unit with an output shaft driven by a second motor of the dual motor drive unit, the method comprising the steps of:
   actuating a clutching device for drivingly engaging the first motor with the output shaft;
   synchronizing a rotational speed of the first motor with a rotational speed of the output shaft;
   when the rotational speed of the first motor and the rotational speed of the output shaft are synchronized, reducing an output torque of the first motor; and
   when the clutching device drivingly engages the first motor with the output shaft, increasing the output torque of the first motor.

2. The method according to claim 1, wherein the dual motor drive unit is disposed in a vehicle and wherein the actuating and the synchronizing are initiated when a vehicle speed falls below a threshold vehicle speed, wherein the threshold vehicle speed is determined based on a current vehicle speed and on an acceleration or deceleration input signal provided by an operator of the vehicle.

3. The method according to claim 1, wherein the synchronizing includes determining an engagement speed of the first motor and tuning the rotational speed of the first motor to the engagement speed.

4. The method according to claim 3, wherein the rotational speed of the first motor and the rotational speed of the output shaft being synchronized includes one of:

the rotational speed of the first motor matching the engagement speed; and a synchronization duration exceeding a maximum synchronization duration.

5. The method according to claim 1, wherein the first motor is a variable displacement hydrostatic motor in fluid communication with a variable displacement hydrostatic pump, wherein the synchronizing includes at least one of:

changing the hydraulic displacement of the first motor; and changing the hydraulic displacement of the hydrostatic pump.

6. The method according to claim 5, wherein the synchronizing includes
increasing the hydraulic displacement of the first motor and increasing the hydraulic displacement of the hydrostatic pump.

7. The method according to claim 6, wherein the hydraulic displacement of the hydrostatic pump is increased based on a rotational speed of the hydrostatic pump.

8. The method according to claim 7, wherein the increase in the hydraulic displacement of the hydrostatic pump is a decreasing function of the rotational speed of the hydrostatic pump.

9. The method according to claim 8, wherein the tuning includes the step of:

applying a proportional-integral (PI) controller using the engagement speed of the first motor as the desired value and using the displacement of the first motor as the control variable.

10. The method according to claim 1, wherein the first motor is a variable displacement hydrostatic motor in fluid communication with a variable displacement hydrostatic pump, wherein the reducing of the output torque of the first motor includes at least one of:

reducing the hydraulic displacement of the first motor; and reducing the hydraulic displacement of the hydrostatic pump; and wherein the increasing of the output torque of the first motor includes increasing the hydraulic displacement of the first motor.

11. The method according to claim 5, further including the steps of:

detecting an acceleration of the vehicle during the synchronizing; and, if the detected acceleration of the vehicle exceeds a threshold acceleration, altering at least one of the following synchronization parameters:

a maximum synchronization duration;

an upper bound of a hydraulic displacement of the first motor;

a rate of changing the hydraulic displacement of the first motor during the synchronization process; and a rate of changing the hydraulic displacement of the hydrostatic pump during the synchronization process.

12. A dual motor drive unit, comprising:
an output shaft;
a first motor;
a clutching device adapted to selectively drivingly engage the first motor with the output shaft;
a second motor drivingly engaged with the output shaft;
a first speed sensor for measuring a rotational speed of the first motor;
a second speed sensor for measuring a rotational speed of the output shaft; and
a control unit;
wherein the control unit is adapted to control the clutching device;
wherein the control unit is adapted to control the rotational speed of the first motor and to synchronize the rotational speed of the first motor with the rotational speed of the output shaft;
wherein the control unit is adapted to decrease an output torque of the first motor when the first motor and the output shaft are synchronized; and
wherein the control unit is adapted to increase the output torque of the first motor when the first motor is drivingly engaged with the output shaft through the clutching device.

13. The dual motor hydrostatic drive unit according to claim 12, wherein the second motor is a hydrostatic motor, the drive unit further including:

a hydraulic accumulator assembly comprising a high pressure hydraulic accumulator and a low pressure hydraulic accumulator; and an accumulator valve adapted to selectively fluidly connect the hydraulic accumulator assembly to at least one of the first motor and the second motor;

wherein the control unit is adapted to control the accumulator valve for regulating the hydrostatic pressure in the hydrostatic circuit comprising at least one of the first motor and the second motor.

* * * * *